(12) United States Patent
Eisenhour

(10) Patent No.: US 8,574,734 B2
(45) Date of Patent: Nov. 5, 2013

(54) VEHICLE BATTERY TEMPERATURE CONTROL SYSTEM CONTAINING HEATING DEVICE AND METHOD

(75) Inventor: Ronald S. Eisenhour, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 461 days.

(21) Appl. No.: 12/828,116

(22) Filed: Jun. 30, 2010

(65) Prior Publication Data
US 2012/0003516 A1    Jan. 5, 2012

(51) Int. Cl.
*H01M 2/00* (2006.01)
*H01M 10/50* (2006.01)

(52) U.S. Cl.
USPC .............................................. 429/62; 429/61

(58) Field of Classification Search
USPC ..................................................... 429/62, 61
See application file for complete search history.

(56) References Cited

U.S. PATENT DOCUMENTS

| | | | |
|---|---|---|---|
| 4,007,315 A * | 2/1977 | Brinkmann et al. | 429/62 |
| 4,329,407 A | 5/1982 | Gross et al. | |
| 5,269,146 A * | 12/1993 | Kerner | 62/3.6 |
| 6,942,944 B2 | 9/2005 | Al-Hallaj et al. | |
| 2007/0148503 A1 | 6/2007 | Okazaki | |
| 2009/0246606 A1 | 10/2009 | Shimizu | |
| 2009/0249802 A1* | 10/2009 | Nemesh et al. | 62/56 |
| 2009/0305124 A1 | 12/2009 | Ahn et al. | |
| 2010/0025125 A1 | 2/2010 | Bienert et al. | |

FOREIGN PATENT DOCUMENTS

| | | | |
|---|---|---|---|
| GB | 2295264 A | * | 5/1996 |
| JP | H09-259940 | | 10/1997 |
| JP | H11-040211 | | 2/1999 |
| WO | WO-2009/046269 | | 4/2009 |

OTHER PUBLICATIONS

Honda et al., Machine translation of JP 11-040211 A, Feb. 1999.*
The International Search Report and the Written Opinion of the International Search Authority for International Application No. PCT/US2011/042337, dated Sep. 21, 2011, mailed Sep. 28, 2011.
Ahmad A. Pesaran, "Battery Thermal Management in EVs and HEVs: Issues and Solutions", Advanced Automotive Battery Conference, Las Vegas NV, Feb. 6-8, 2001.
Uwe Wiedemann et al., "Advanced energy storage systems for Hybrids" published prior to Jun. 30, 2010.
"Traction Battery Systems Thermal Management", Lecture Handout, Wayne State University, MI, published prior to Jun. 30, 2010.

* cited by examiner

*Primary Examiner* — Sean P Cullen
(74) *Attorney, Agent, or Firm* — Global IP Counselors, LLP

(57) ABSTRACT

A vehicle battery temperature control system includes a battery, a heating device, a housing, a heat exchanger and a sensor. The battery has a heat sink that transfers thermal energy to the battery. The heating device is selectively operable to provide thermal energy. The housing includes a chamber that contains the battery and a saturated liquid coolant that substantially immerses the heat sink, and the coolant receives the thermal energy from the heating device to cause a phase change of the coolant from liquid to vapor to heat the heat sink which heats the battery. The heat exchanger removes thermal energy from the vapor to change the vapor to liquid and returns the liquid to the chamber. The sensor detects a characteristic of the vapor and signals operation of the heating device to provide the thermal energy based on a relationship between the characteristic and a threshold.

23 Claims, 3 Drawing Sheets

VEHICLE BATTERY TEMPERATURE CONTROL SYSTEM CONTAINING HEATING DEVICE AND METHOD

BACKGROUND

1. Field of the Invention

The present invention generally relates to vehicle battery temperature control. More specifically, the present invention relates to a vehicle battery temperature control system and method that use liquid phase and vapor phase coolant to maintain desired battery temperature, and add thermal energy to the coolant to increase the coolant temperature as desired.

2. Background Information

A hybrid electric vehicle (HEV) or full electric vehicle relies substantially or completely on battery power for operation. Therefore, it is desirable to maintain the battery cells at an optimal operating temperature. As understood in the art, battery cells are often best suited to operate in a somewhat small optimum temperature range. Consequently, the life or durability of the battery, as well as the performance of the battery, such as the available power provided by the battery, can be adversely affected by temperatures above and below that optimum temperature range. Furthermore, to optimize battery performance, it is essential to maintain temperature uniformity among the cells of a battery, for example, multiple battery cells assembled in a battery module.

Typically, batteries of HEVs or full electric vehicles can be cooled by air, or by a liquid coolant that, for example, has a high water content. However, when cooling fluid is provided by a pumping mechanism, such as a fan or liquid pump, in a single phase (e.g., a liquid phase), temperature gradients will exist along the flow path. That is, because heat is transferred at all points along the flow path, the temperature of the liquid coolant increases from the entrance to the exit of the battery assembly. These gradients can be somewhat reduced by increasing fluid flow rate, which consumes greater energy. Also, shortened parallel flow paths along the cells can be used instead of a serial flow path.

One example of a cooling system uses the vehicle's air-conditioning (A/C) system to cool the battery structure. However, this type of arrangement requires that considerable energy be expended to pump the refrigerant and achieve the desired cooling effects. Moreover, if the A/C system does not operate, the refrigerant will eventually all vaporize within the battery assembly, and as a consequence, the pressure and temperature inside the battery assembly will elevate. This elevation in pressure and/or temperature could result in lost battery performance due to temperature gradients that compromise the optimum operating temperature. Furthermore, the A/C system of a vehicle generally operates at temperatures around 5 degrees Celsius, which is colder than the optimum operating battery temperature range. Accordingly, a control system is required that, for example, pulses cold refrigerant into the battery assembly so as not to overcool the battery. However, this pulsing can create large and detrimental temperature gradients within the battery assembly, thus degrading the battery's life and performance.

In addition, batteries of HEV and full electric vehicles either rely on internal heat generation or heating of an adjacent fluid (e.g., air or coolant) as the main means to reach the ideal operating temperature range for their battery. As discussed above, consequences to battery life and performance at temperatures above and below that temperature range are very undesirable, and temperature uniformity among battery cells is essential to optimize performance.

Accordingly, when single phase (e.g., vapor or liquid) flow of a heated fluid is provided by some type of pumping mechanism (e.g., a fan or liquid pump) as discussed above, temperature gradients will exist along its flow path because heat is transferred at all points along the path. Therefore, the heating fluid temperature decreases from the entrance to the exit of the battery assembly, which could create temperature gradients in the battery that degrade performance. Also, internal battery heating may be a slow process, and therefore, a significant period of time colder than the ideal operating temperature may exist, which can have adverse effects such as reduce driving range as discussed above. Alternatively, multiple heaters can be used in the battery itself to attempt to evenly heat the cells of the battery. However, this arrangement would require that the temperature of each cell be monitored and the appropriate power level be applied to each heater, thus making the arrangement complicated and costly.

SUMMARY

It has been discovered that to improve temperature control for a vehicle battery, coolant in liquid and vapor phase can be used, and thermal energy can be added to the coolant to increase the coolant temperature as desired.

In view of the state of the known technology, one aspect of the present invention is to provide a vehicle battery temperature control system comprising a battery, a heating device, a housing, a heat exchanger and a sensor. The battery has a heat sink configured to transfer thermal energy to the battery. The heating device is selectively operable to provide thermal energy. The housing includes a chamber that is configured to receive the battery and contain a saturated liquid coolant that substantially immerses the heat sink so that the coolant receives the thermal energy from the heating device to cause a phase change of the coolant from a liquid phase to a vapor phase to heat the heat sink to enable the heat sink to heat the battery. The heat exchanger is configured to receive vapor phase coolant from the chamber and remove thermal energy from the vapor phase coolant to change the coolant from the vapor phase to the liquid phase, and is further configured to return the liquid phase coolant to the chamber. The sensor is operable to detect a characteristic of the vapor phase coolant and to signal operation of the heating device to provide the thermal energy based on a relationship between the characteristic of the vapor phase coolant and a threshold.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
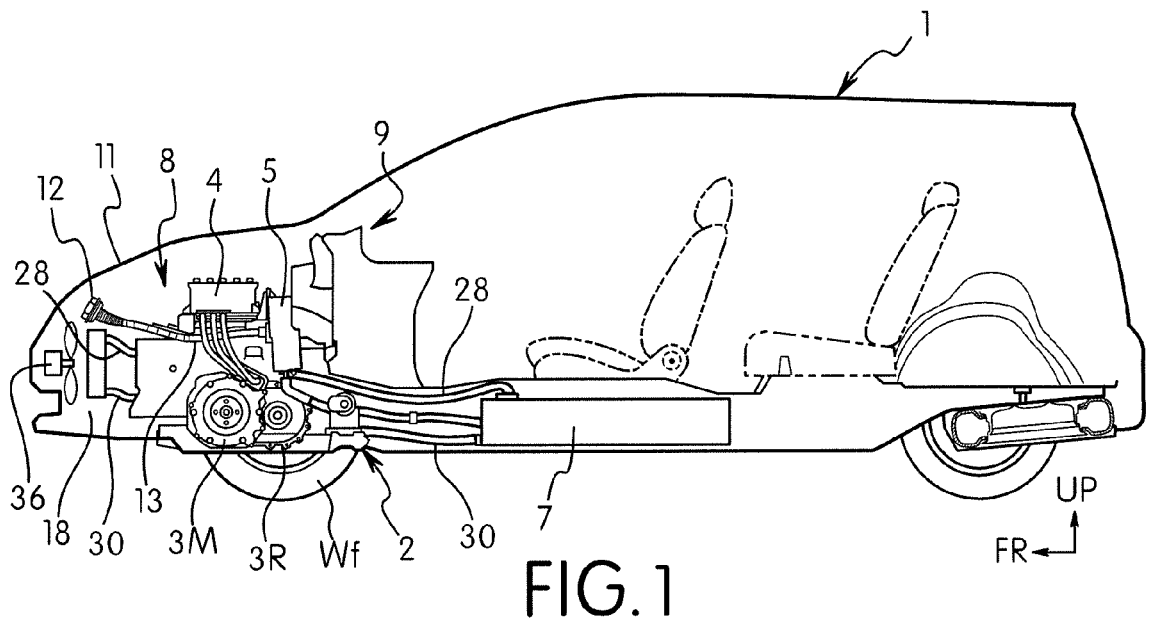
FIG. 1 is an exemplary diagram of an electric vehicle employing a vehicle battery temperature control system in accordance with an illustrated embodiment.
Figure 2:
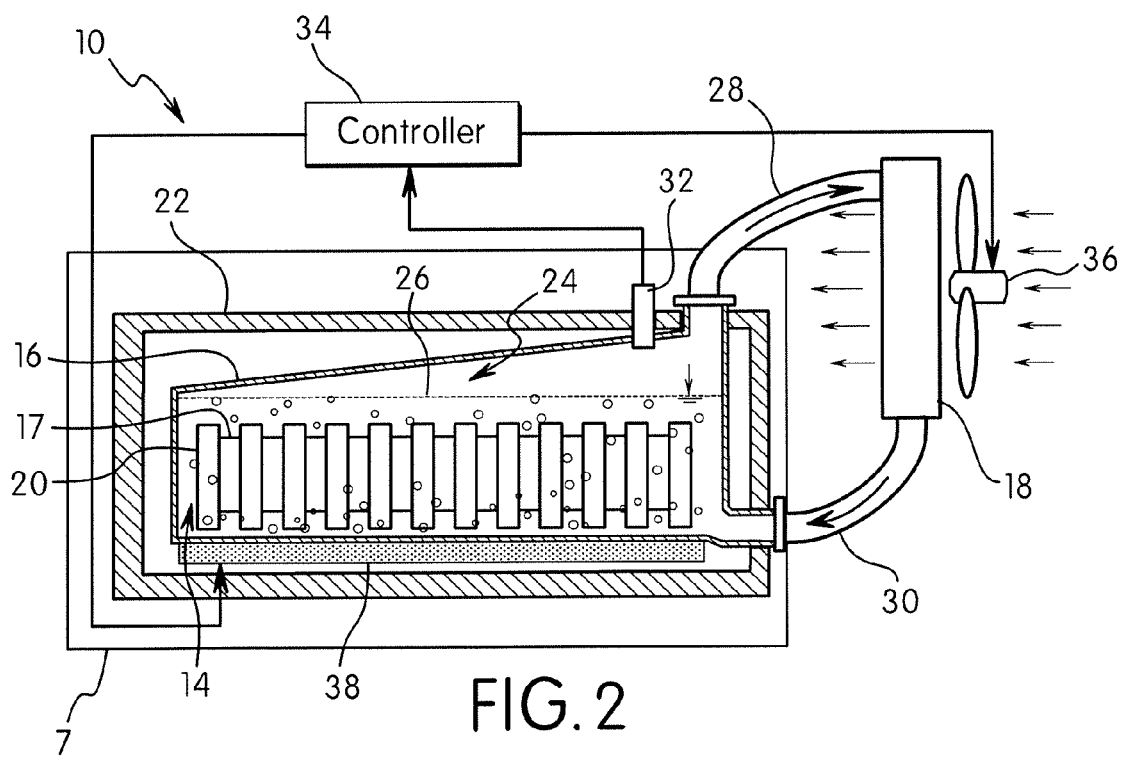
FIG. 2 is a detailed exemplary diagram of the vehicle battery temperature control system employed in the vehicle shown in FIG. 1.

Referring initially to FIGS. 1 and 2, a portion of an electric vehicle 1 is partially illustrated with a vehicle battery temperature control system 10 in accordance with a first embodiment. In the figures, an arrow FR indicates a frontward direction of the vehicle, and an arrow UP indicates an upward direction of the vehicle.

In this embodiment, the vehicle 1 includes a vehicle body 2 that supports a power unit 3 that includes an electric motor 3M and a reduction gear 3R. The electric motor 3M and the reduction gear 3R are configured as a single integrated unit. The electric motor 3M is installed in a front section of the vehicle body 2. The electric motor 3M is operatively coupled to a pair of front wheels Wf in a conventional manner to rotate the front wheels Wf. Thus, the electric motor 3M propels the vehicle 1. In addition to the electric motor 3M, various comparatively heavy electrical components are mounted on the vehicle body 2 In particular, as shown in FIGS. 1 and 2, the vehicle body 2 also supports various comparatively heavy electrical components including, but not limited to, an inverter 4, a circuit box 5, a charger (not shown) and a battery unit 7.

In this embodiment, the electric motor 3M, the inverter 4 and the circuit box 5 are arranged in a frontward portion of the vehicle 1. Meanwhile, the battery unit 7 is arranged in a longitudinally middle portion of the vehicle 1 and the charger (not shown) is arranged in a rearward portion of the vehicle 1. In this way, a plurality of electrical components are arranged to be distributed appropriately in the longitudinal direction of the vehicle 1 such that the weight of the vehicle 1 can be more easily balanced with respect to the longitudinal direction.

As shown in FIG. 1, a front compartment 8 is formed in a frontward portion of the vehicle 1. The front compartment 8 is a space surrounded by a dash panel 9 on a rearward side, a fender panel (not shown) on each of both widthwise sides, and a bumper (not shown) and grill (not shown) on a frontward side. A hood 11 is arranged and configured such that the hood 11 can open and close an upper opening of the front compartment 8. The power unit 3 (the electric motor 3M and the reduction gear 3R), the inverter 4, the circuit box 5, and other components are housed inside the front compartment 8.

While only one charging port 12 is illustrated, typically, two or more charging ports could be provided. A low-voltage charging port would be provided to conduct charging at a comparatively low (household) voltage (e.g., 100V or 200V). A high-voltage charging port would be provided to conduct charging at a comparatively high voltage (e.g., 500 V). The charging harnesses 13 are connected to the charging ports. Low-voltage electric power supplied to the low-voltage charging port from a low-voltage power supply cord is converted to a higher voltage by the charger (which includes a transformer (not shown) for converting a low voltage to a higher voltage) and the higher voltage power is supplied to the battery cells of a battery 14 (FIG. 2) inside the battery unit 7 through the circuit box 5 (conductor portions inside the circuit box 5). High-voltage electric power supplied to the high-voltage charging port from a high-voltage power supply cord is supplied to the battery 14 inside the battery unit 7 through the circuit box 5 (conductor portions inside the circuit box 5). The high-voltage charging port enables charging to be completed at a faster rate. In addition to the transformer, the charger is also provided with additional electrical components such components as a rectifier circuit for converting alternating current to direct current and a filter.

As shown in more detail in FIG. 2, in addition to the battery 14, the vehicle battery temperature control system 10 also includes a housing 16 and a heat exchanger 18. The battery 14 includes a plurality of stacked battery cells 17 and a heat sink 20 that can be configured as a single heat sink or a plurality of heat sinks, and can have any suitable heat exchange features as understood in the art. During operation, the battery 14 becomes heated and thus discharges thermal energy. The heat sink 20 can transfer the thermal energy generated by the battery 14 away from the battery 14, or can transfer thermal energy to the battery 14.

The housing 16 includes an insulation member 22 configured to substantially enclose the housing 16. As illustrated, the battery 14 and heat sink 20, housing 16, insulation member 22 and associated components described herein are included in the battery unit 7 shown in FIG. 1. The housing 16 defines a chamber 24 that is configured to receive the battery 14 and contain a saturated liquid coolant 26 that substantially immerses the heat sink 20 so that the coolant receives the thermal energy from operation of the battery 14 to cause a phase change of the coolant from a liquid phase to a vapor phase. In this example, the coolant 26 includes 1,1,1,2-Tetrafluoroethane (known as R-134a) or 2,3,3,3-Tetrafluoroprop-1-ene (known as HFO-1234yf). However, the coolant 26 can include any suitable type of liquid or refrigerant. Furthermore, the chamber 24 can be configured such that the saturated liquid coolant 26 in the chamber 24 completely immerses the heat sink 20. The liquid volume of common types of refrigerants are reasonably stable across the expected ambient temperature range.

The heat exchanger 18 is configured in an elevated position with respect to the chamber 24 to receive vapor phase coolant from the chamber 24, and remove thermal energy from the vapor phase coolant to change the coolant from the vapor phase to the liquid phase. In this example, the heat exchanger 18 receives the vapor phase coolant from the chamber 24 via a conduit 28 that can be a tube made of rubber, metal or any other suitable material. The heat exchanger 18 is further configured to return the liquid phase coolant to the chamber 24 via a conduit 30 that can be a tube made of rubber, metal or any other suitable material. In one configuration, the heat exchanger 18 includes a condenser that is fluidly coupled to receive the vapor phase coolant from the chamber 24 via conduit 28. The condenser is operable to remove heat from the vapor phase coolant to create the liquid phase coolant, and is fluidly coupled to return the liquid phase coolant to the chamber 24 via conduit 30.

It should be noted that the insulation member 22 ensures that the management of the temperature in the chamber 24 is principally controlled at the heat exchanger 18 (condenser). This is particularly beneficial when, for example, the battery 14 is a cold battery pack operating in a low ambient temperature condition. By limiting heat transfer or adding heat, for example, through warm airflow from the passenger cabin to the condenser, the self heating of the battery 14 can be used to reach the optimum operating temperature range.

As further shown in FIG. 2, the system 10 includes a sensor 32, a controller 34 and a fan 36. The sensor 32, controller 34, and fan 36 are conventional components that are well known in the art. Since these components are well known in the art, these structures will not be discussed or illustrated in significant detail herein. Rather, it will be apparent to those skilled in the art from this disclosure that the components can be any type of structure and/or programming that can be used to carry out the present invention.

The sensor 32 is operable to detect when a characteristic of the vapor phase coolant is above a threshold, and to signal operation of the fan 36 that increases the removal of thermal energy by the heat exchanger 18 when the characteristic is above the threshold. In this example, the sensor 32 provides a signal to a controller 34 which determines whether the characteristic is above the threshold. If the characteristic is above the threshold, the controller 34 controls the fan 36 to operate. The fan 36 can be configured as a single fan or multiple fans.

The controller 34 can be any suitable type of computer, microprocessor or control device as known in the art. The controller 34 preferably includes a microcomputer with a control program that controls the operations as discussed below. The controller 34 can also include other conventional components such as an input interface circuit, an output interface circuit, and storage devices such as a ROM (Read Only Memory) device and a RAM (Random Access Memory) device. A memory circuit (not shown) stores processing results and control programs such as ones for the operations discussed herein. It will be apparent to those skilled in the art from this disclosure that the precise structure and algorithms for the controller 34 can be any combination of hardware and software that will carry out the functions of the present invention.

The sensor 32 includes a temperature sensor that is operable to sense a temperature of the vapor phase coolant in the chamber 24 as the characteristic. In this event, the threshold can be an upper temperature threshold, such as a temperature threshold at or about 45 degrees Celsius. Alternatively, or in addition, the sensor 32 includes a pressure sensor operable to sense a pressure in the chamber 24 as the characteristic. In this event, the threshold can be an upper pressure threshold, such as pressure at or about 1100 kPa. Naturally, any suitable temperature threshold or pressure threshold can be used.

Concerning the operation of the system 10, it is understood in the art that when a fluid, such as coolant 26, is contained in a saturated state, coolant in the liquid phase and in the vapor phase coexist at a specific temperature and pressure within the chamber 24. When heat (thermal energy) is added due to, for example, heating of the battery 14 during operation of the battery 14, temperature uniformity is maintained by the fluid vaporizing at the same or substantially the same pressure. This temperature stability and uniformity maintains the cells of the battery 14 at the same or substantially the same temperature within the battery 14. Moreover, since the phase change from a low energy content liquid phase to a high energy content vapor phase results in a density change, vapor bubbles are separated from the liquid by gravity. That is, vapor bubbles rise to the upper part of the chamber 24. Accordingly, the vapor phase coolant can flow via the conduit 28 into the heat exchanger 18, and is thus transported away from the heat source (i.e., the battery 14) without a pumping mechanism.

Moreover, the formation of bubbles absorbs considerable energy without causing a rise in temperature of the coolant 26, and the mixing action of the bubbles in moving toward the free surface of the coolant 26 toward the upper part of the chamber 24 further enhances the temperature uniformity in the battery 14. Also, since the liquid phase coolant 26 is in a saturated state, temperature uniformity is maintained throughout the battery 14, and the change from the liquid phase to the vapor phase is used to quickly and naturally transport high energy content vapor phase coolant 26 to the heat exchanger 18, due to the vapor density of the vapor phase coolant 26 being much less than that of the surrounding liquid phase coolant 26. This action further enhances the convective heat transfer within the battery 14. The battery 14 can be permitted to heat up when the cooling fan 36 is not being operated, and can be maintained at approximately the ambient air temperature of the heat exchanger 18 when the cooling fan 36 is operated.

In addition, varied airflow provided by fan 36 to the heat exchanger 18 assists in managing the pressure and corresponding operating temperature of the coolant 26 and battery 14. As discussed above, a temperature and/or pressure sensor 32 is used to signal the controller 34 to operate the cooling fan 36 in the appropriate manner to achieve the desired temperature of the coolant 26. The source of the airflow provided by the fan 36 can be air external to the vehicle 1 that is drawn in by the fan 36. Also, the source of the airflow can be pre-cooled or pre-heated air that is provided, for example, by the heating ventilating and air-conditioning (HVAC) system of the vehicle 1 or other means to assist the fan 36 and heat exchanger 18 in maintaining the coolant 26, and thus the battery 14, within the target temperature range.

Accordingly, the heat transfer from the vapor phase coolant to the environment external of the system 10 can be managed with the condensing heat exchanger (condenser) 18 and cooling fan 36. The reformation of liquid phase coolant from the vapor phase coolant by the heat exchanger 18 thus maintains the target pressure and corresponding target temperature of the coolant 26, which results in a stable temperature environment for the battery cell heat sink structure. The system 10 is inherently isothermal and does not require forced fluid flow within the battery 14 to perform the required heat exchange functions. Rather, the system 10 allows for the natural flow of high energy vapor phase coolant to the heat exchanger 18 as discussed above, instead of requiring, for example, a pump to force the flow of coolant to a heat exchanger.

That is, as understood in the art, the circulation (e.g., pumping) of saturated fluids, such as a liquid-vapor refrigerant, can be used to transport thermal energy from the battery 14 to the heat exchanger 18 and vice-versa. In such an arrangement, some liquid phase coolant can be exposed to the heat exchanger 18 along with the vapor phase coolant, so that thermal energy from that portion of the liquid and the vapor can be transferred by the heat exchanger 18 to an external environment, thereby cooling the vapor and that portion of the liquid. However, although the pumping action may facilitate improved heat transfer in the system 10, such pumping uses energy that can otherwise be used to power other components of the vehicle 1. Hence, the isothermal features of the system 10 are beneficial in that they can avoid the use of a pumping mechanism.

Furthermore, the system 10 includes a heating device 38 that is controlled by the controller 34 in response to a signal provided by the sensor 32. The heating device 38 is an electrical type of heating device, or any other type of appropriate heating device, that is disposed in the lower portion of the insulation member 22. Specifically, the heating device 38 is disposed inside of the insulation member 22 that surrounds the housing 16, and is positioned adjacent to the housing 16 or proximate to the housing 16.

The sensor 32 detects when a characteristic of the vapor phase coolant is below a threshold, and provides a signal to the controller 34. That is, the sensor 32 detects when a temperature of the vapor phase coolant is below a threshold (e.g., about 18 degrees Celsius) or when the pressure in the chamber 24 is below a threshold (e.g., 400 kPa), and provides a signal to the controller 34. In response, the controller 34 controls the heating device 38 to operate and thus transfer thermal energy to the coolant 26 in the chamber 24. The phase change in the coolant 26 resulting from heating the coolant 26 in that low location in the chamber 24 enables the heat to be transport throughout the liquid coolant 26. When the sensor 32 detects that the temperature and/or pressure of the coolant in the chamber 24 reaches the prescribed threshold, the sensor 32 signals to the controller 34 to turn off the heating device 38. Thus, the heating device 38 heats the coolant 26 to maintain the target pressure and corresponding target temperature of the coolant 26, and thus the target temperature range of the battery 14. Generally, the controller 34 will turn the fan 36 off when operating the heating device 38. However, the controller 34 can control the fan 36 and heating device 38 to operate in a cooperative manner to maintain the target pressure and corresponding target temperature of the coolant 26.

As can be appreciated from the above, by heating the coolant 26 from the bottom of the chamber 24 and thus, from the bottom of the battery 14, there is no need for a pump or mechanical agitation device to heat the coolant 26. Rather, the conversion of the coolant 26 to the vapor phase by the heating and subsequent buoyancy force of the vapor creates sufficient agitation and thermal exposure of the liquid coolant 26 to transfer heat to the battery 14 in a uniform or substantially uniform manner. Furthermore, the saturated properties of the coolant 26 enable uniform or substantially uniform temperature rise within the chamber 24, which avoids the creation of thermal gradients in the battery 14 and, thus minimizes or eliminates performance loss in the battery 14 due to such gradients. That is, since the coolant 26 is in a saturated state, the liquid coolant 26 in the area of the chamber 24 near the heating device 38 will form vapor. In the process of achieving thermal equilibrium, a portion of the vapor will become liquid as the vapor rises through the lower temperature liquid coolant 24. This process releases the heat of vaporization to the static liquid coolant 26 located within the battery assembly. Accordingly, the entire mass of the saturated liquid coolant 26 can be evenly heated as the target battery operating temperature is achieved.

In addition, in the system 10 discussed above, and in the variations discussed below, a reservoir of the saturated coolant could also be maintained at, for example, a location away from the battery 24 and be pumped into the chamber 24 at a rate controlled by, for example, controller 34, to rapidly change the temperature of the liquid phase coolant.

Second Embodiment

Figure 3:
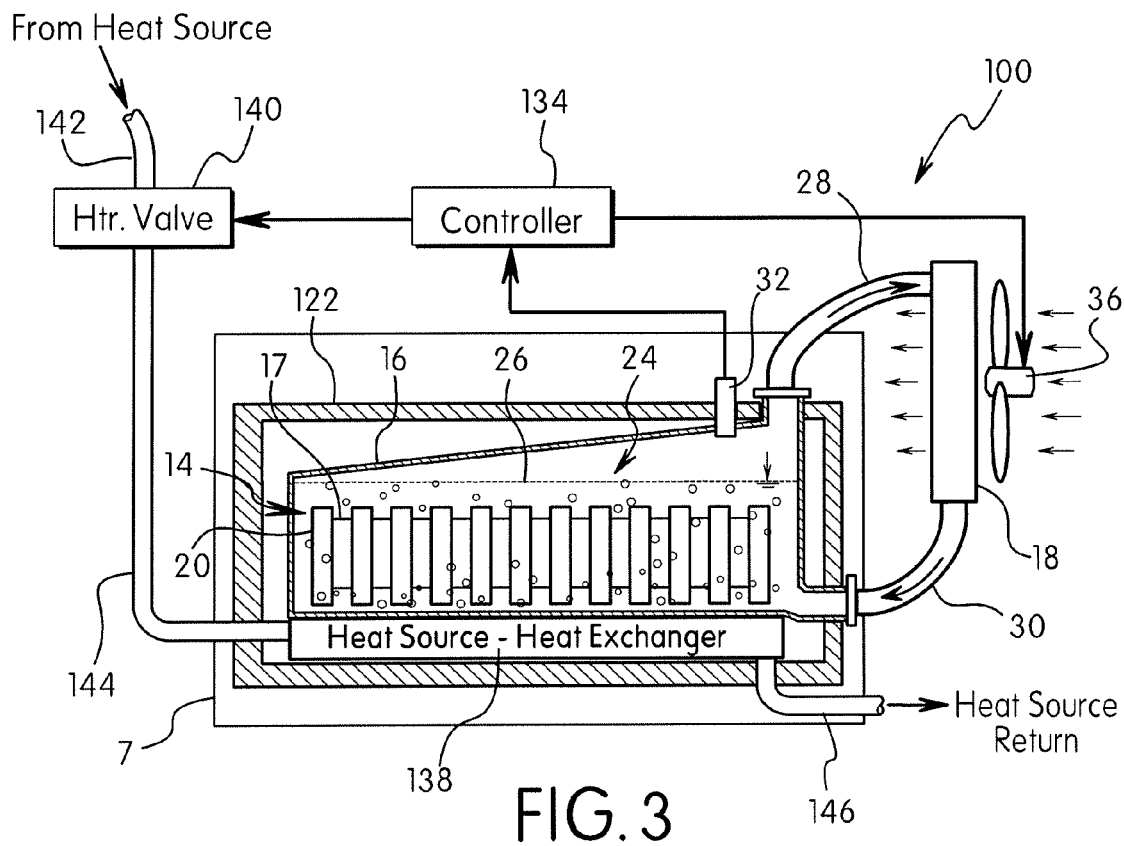
FIG. 3 is a detailed exemplary diagram of another embodiment of the vehicle battery temperature control system employed in the vehicle shown in FIG. 1.

Referring now to FIG. 3, a vehicle battery temperature control system in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with different reference numerals.

The vehicle battery temperature control system 100 is illustrated in FIG. 3 in accordance with the second embodiment. The vehicle battery temperature control system 100 includes a battery 14 having a heat sink 20 similar to that described above with regard to vehicle battery temperature control system 10. The vehicle battery temperature control system 100 further includes a housing 16 and a heat exchanger 18. The housing 16 includes an insulation member 122 which is similar to insulation member 22 and configured to substantially enclose the housing 16. As illustrated, the battery 14 and heat sink 20, housing 16, insulation member 122, heat exchanger 18 and associated components described herein are included in the battery unit 7 shown in FIG. 1.

The housing 16 defines a chamber 24 that is configured to receive the battery 14 and contain a saturated liquid coolant 26 that substantially immerses the heat sink 20 so that the coolant receives the thermal energy from operation of the battery 14 to cause a phase change of the coolant from a liquid phase to a vapor phase as in the vehicle battery temperature control system 10. In this example, the coolant 26 includes 1,1,1,2-Tetrafluoroethane (known as R-134a) or 2,3,3,3-Tetrafluoroprop-1-ene (known as HFO-1234yf). However, the coolant 26 can include any suitable type of refrigerant. Furthermore, the chamber 24 can be configured such that the saturated liquid coolant 26 in the chamber 24 completely immerses the heat sink 20 as discussed above with regard to vehicle battery temperature control system 10.

The heat exchanger 18 is configured in an elevated position with respect to the chamber 24 to receive vapor phase coolant from the chamber 24, and remove thermal energy from the vapor phase coolant to change the coolant from the vapor phase to the liquid phase. The heat exchanger 18 also can operate to add thermal energy to the vapor phase coolant to maintain the desired temperature and pressure in the chamber 24. In this example, the heat exchanger 18 is positioned substantially above a level of the liquid coolant 26 in the chamber 14.

Furthermore, the system 10 includes a heating device 138 that is controlled by the controller 134 in response to a signal provided by the sensor 32. The heating device 138 in this embodiment includes a heat exchanger that is disposed in the lower portion of the insulation member 122. Specifically, the heating device 138 is disposed inside of the insulation member 122 that surrounds the housing 16, and is positioned adjacent to the housing 16 or proximate to the housing 16.

Furthermore, the heating device 138 is coupled to a heat source, such as the heating features of the HVAC system of the vehicle 1, via valve 140 that is coupled to conduits 142 and 144. The heating device 138 further includes a conduit 146 that is coupled to the heat source. The conduits 142, 144 and 146 can be tubing made of metal, rubber or any other suitable material. The heating device 138 functions like a heat pump to move heat from the heat source to the saturated liquid coolant 26. Thus, a heating system including heating device 138 can deliver heat to the saturated liquid coolant 26 without consuming power to energize an electrical heating device. Therefore, less electrical power is consumed for heat transfer to achieve a temperature increase within the chamber 24.

The sensor 32 detects when a characteristic of the vapor phase coolant is below a threshold, and provides a signal to the controller 134. That is, the sensor 32 detects when a temperature of the vapor phase coolant is below a threshold (e.g., about 18 degrees Celsius) or when the pressure in the chamber 24 is below a threshold (e.g., about 400 kPa), and provides a signal to the controller 134. In response, the controller 134 controls the valve 140 to open to permit heated fluid or air to enter the heat exchanger of the heating device 138 via conduits 142 and 144 to operate and thus transfer thermal energy to the coolant 26 in the chamber 24. The heated air or fluid returns to the heat source via conduit 146. The phase change in the coolant 26 resulting from heating the coolant 26 in that low location in the chamber 24 enables the heat to be transport throughout the liquid coolant 26 to achieve the advantages discussed above with regard to the first embodiment. When the sensor 32 detects that the temperature and/or pressure of the coolant in the chamber 24 reaches the prescribed threshold, the sensor 32 signals to the controller 134 to turn off the heating device 38. Thus, the heating device 38 heats the coolant 26 to maintain the target pressure and corresponding target temperature of the coolant 26, and thus the target temperature range of the battery 14. Generally, the controller 134 will turn the fan 36 off when operating the heating device 38. However, the controller 134 can control the fan 36 and heating device 38 to operate in a cooperative manner to maintain the target pressure and corresponding target temperature of the coolant 26.

Third Embodiment

Figure 4:
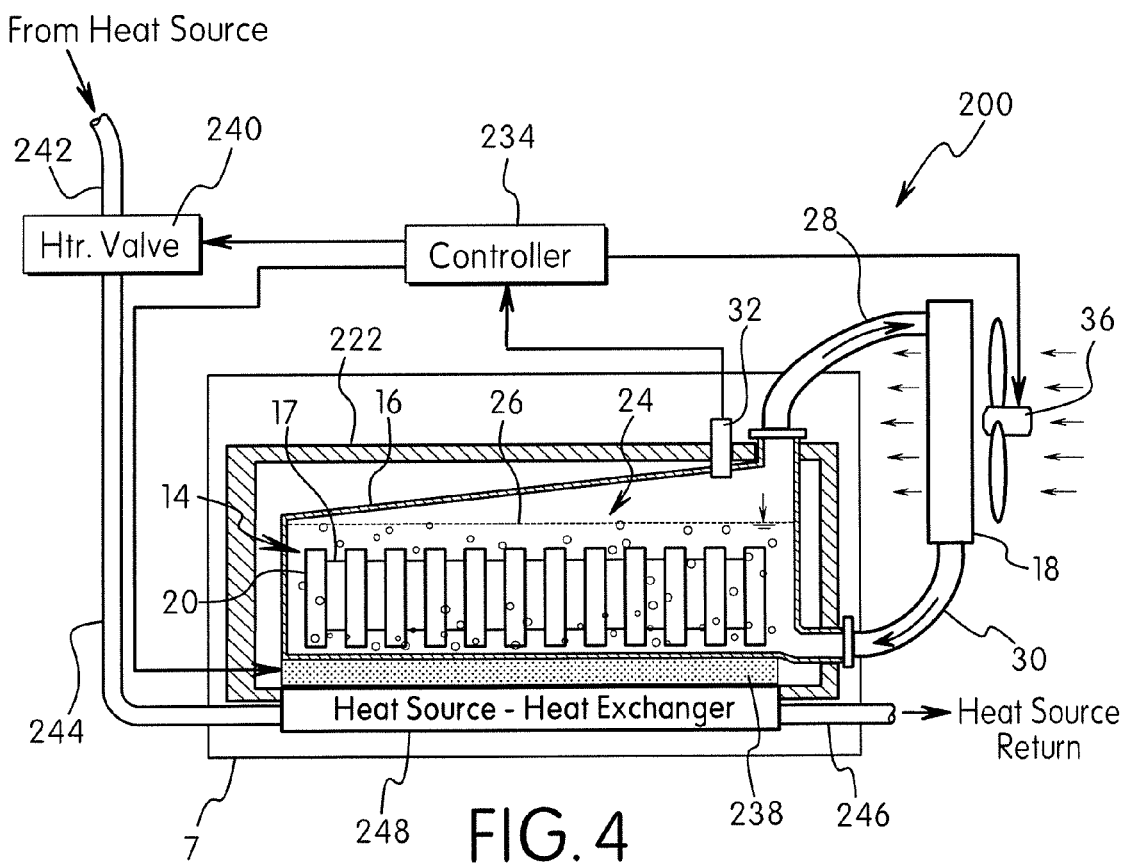
FIG. 4 is a detailed exemplary diagram of a further embodiment of the vehicle battery temperature control system employed in the vehicle shown in FIG. 1.

Referring now to FIG. 4, a vehicle battery temperature control system in accordance with a third embodiment will now be explained. In view of the similarity between the first, second and third embodiments, the parts of the third embodiment that are identical to the parts of the first and second embodiments will be given the same reference numerals as the parts of the first and second embodiments. Moreover, the descriptions of the parts of the third embodiment that are identical to the parts of the first and second embodiments may be omitted for the sake of brevity. The parts of the third embodiment that differ from the parts of the first and second embodiments will be indicated with different reference numerals.

The vehicle battery temperature control system 200 is illustrated in FIG. 4 in accordance with the third embodiment. The vehicle battery temperature control system 200 includes a battery 14 having a heat sink 20 similar to that described above with regard to vehicle battery temperature control system 10. The vehicle battery temperature control system 200 further includes a housing 16 and a heat exchanger 18. The housing 16 includes an insulation member 222 which is similar to insulation member 22 and configured to substantially enclose the housing 16. As illustrated, the battery 14 and heat sink 20, housing 16, insulation member 222, heat exchanger 18 and associated components described herein are included in the battery unit 7 shown in FIG. 1.

The housing 16 defines a chamber 24 that is configured to receive the battery 14 and contain a saturated liquid coolant 26 that substantially immerses the heat sink 20 so that the coolant receives the thermal energy from operation of the battery 14 to cause a phase change of the coolant from a liquid phase to a vapor phase as in the vehicle battery temperature control system 10. In this example, the coolant 26 includes 1,1,1,2-Tetrafluoroethane (known as R-134a) or 2,3,3,3-Tetrafluoroprop-1-ene (known as HFO-1234yf). However, the coolant 26 can include any suitable type of refrigerant. Furthermore, the chamber 24 can be configured such that the saturated liquid coolant 26 in the chamber 24 completely immerses the heat sink 20 as discussed above with regard to vehicle battery temperature control system 10.

The heat exchanger 18 is configured in an elevated position with respect to the chamber 24 to receive vapor phase coolant from the chamber 24, and remove thermal energy from the vapor phase coolant to change the coolant from the vapor phase to the liquid phase. The heat exchanger 18 also can operate to add thermal energy to the vapor phase coolant to maintain the desired temperature and pressure in the chamber 24. In this example, the heat exchanger 18 is positioned substantially above a level of the liquid coolant 26 in the chamber 14.

Furthermore, the system 10 includes a heating system that includes a thermoelectric device 238 that is controlled by the controller 234 in response to a signal provided by the sensor 32. The thermoelectric device 238 is an electrical type of heating device, or any other type of appropriate heating device, that is disposed in the lower portion of the insulation member 222. Specifically, the thermoelectric device 238 is disposed inside of the insulation member 222 that surrounds the housing 16, and is positioned adjacent to the housing 16 or proximate to the housing 16. As understood in the art, the thermoelectric device 238 is operable to provide a low temperature side and a high temperature side, depending on the polarity of the operating voltage applied to the thermoelectric device 238. Accordingly, in the case of heating the coolant 26, the controller 234 controls the application of a voltage to the thermoelectric device 238 to operate the thermoelectric device 238 so that the high temperature side occurs at the top of the thermoelectric device 238 adjacent to the chamber 16 and the low temperature side occurs at the bottom of the thermoelectric device 238. In this event, the thermoelectric device 238 can operate like a heat pump and draw heat from, for example, an exterior source positioned at the bottom of the insulation member 222. That heat, along with the heat generated by the internal electrical power dissipation in the thermoelectric device 238, results in a hot upper surface of the thermoelectric device 238 that warms the saturated liquid coolant 26. Accordingly, the thermoelectric device 238 can be more efficient at heating the saturated coolant 26 than, for example, the heating device 38 used in the first embodiment.

The heating system further includes a heating device 248 which is similar to heating device 138 discussed above, and includes a heat exchanger that is disposed in the lower portion of the insulation member 222. Specifically, the heating device 248 is disposed inside of the insulation member 222 that surrounds the housing 16, and is positioned adjacent to or proximate to the thermoelectric device 238. Naturally, the heating device 248 can be disposed above thermoelectric device 238.

Furthermore, like heating device 138, the heating device 248 is coupled to a heat source, such as the heating features of the HVAC system of the vehicle 1, via valve 240 that is coupled to conduits 242 and 244. The heating device 248 further includes a conduit 146 that is coupled to the heat source. The conduits 242, 244 and 246 can be tubing made of metal, rubber or any other suitable material. Like heating device 138, the heating device 248 functions like a heat pump to move heat from the heat source to the saturated liquid coolant 26. Thus, a heating system including heating device 248 can deliver more heat to the saturated liquid coolant 26 than a heating system that includes only an electrical heating element such as thermoelectric device 238. Therefore, less electrical power is consumed for the same amount of heat transfer and corresponding temperature increase within the chamber 24.

The sensor 32 detects when a characteristic of the vapor phase coolant is below a threshold, and provides a signal to the controller 234. That is, the sensor 32 detects when a temperature of the vapor phase coolant is below a threshold (e.g., about 18 degrees Celsius) or when the pressure in the chamber 24 is below a threshold (e.g., about 400 kPa), and provides a signal to the controller 234. In response, the controller 234 activates the thermoelectric device 238 as discussed above. Alternatively, or in addition, the controller 234 can control the valve 240 to open to permit heated fluid or air to enter the heat exchanger of the heating device 248 via conduits 242 and 244 to operate and thus transfer thermal energy to the coolant 26 in the chamber 24 as with heating device 138 discussed above. The heated air or fluid returns to the heat source via conduit 246. As discussed above, the heating device 248 acts as a heat pump to move heat to the saturated liquid coolant 26. The thermoelectric device 238 also acts as a heat pump to facilitate movement of the heat from the heating device 248 to the saturated liquid coolant 26.

The phase change in the coolant 26 resulting from heating the coolant 26 in that low location in the chamber 24 enables the heat to be transport throughout the liquid coolant 26 to achieve the advantages discussed above with regard to the first and second embodiments.

When the sensor 32 detects that the temperature and/or pressure of the coolant in the chamber 24 reaches the prescribed threshold, the sensor 32 signals to the controller 234 to turn off the thermoelectric device 238 and heating device 248 one at a time or at the same time. Thus, the thermoelectric device 238 and/or heating device 248 heat the coolant 26 to maintain the target pressure and corresponding target temperature of the coolant 26, and thus the target temperature range of the battery 14. Generally, the controller 234 will turn the fan 36 off when operating the thermoelectric device 238 and/or heating device 248. However, the controller 234 can control the fan 36 and thermoelectric device 238 and/or heating device 248 to operate in a cooperative manner to maintain the target pressure and corresponding target temperature of the coolant 26.

Fourth Embodiment

Figure 5:
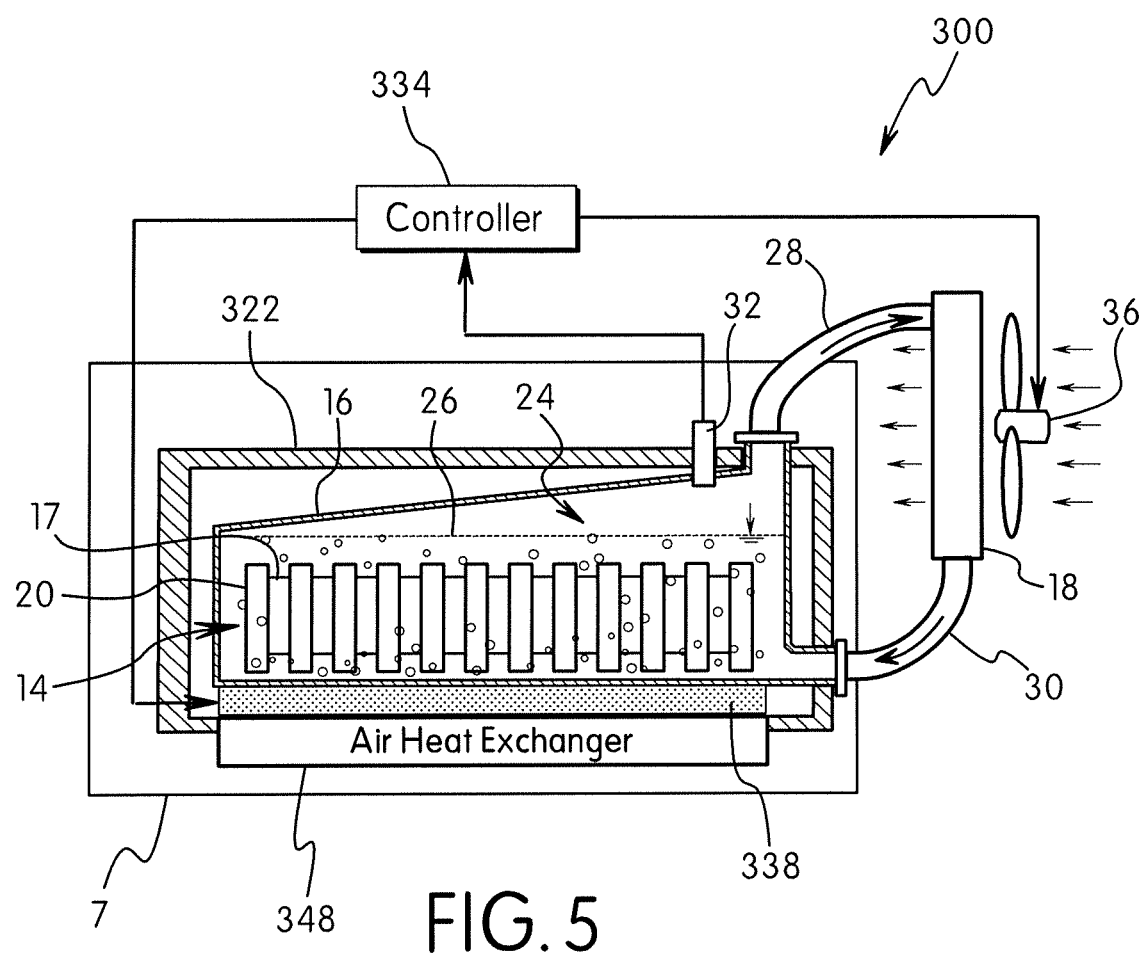
FIG. 5 is a detailed exemplary diagram of still another embodiment of the vehicle battery temperature control system employed in the vehicle shown in FIG. 1.

Referring now to FIG. 5, a vehicle battery temperature control system in accordance with a fourth embodiment will now be explained. In view of the similarity between the first through fourth embodiments, the parts of the fourth embodiment that are identical to the parts of the first through third embodiments will be given the same reference numerals as the parts of the first through third embodiments. Moreover, the descriptions of the parts of the third embodiment that are identical to the parts of the first through third embodiments may be omitted for the sake of brevity. The parts of the fourth embodiment that differ from the parts of the first through third embodiments will be indicated with different reference numerals.

The vehicle battery temperature control system 300 is illustrated in FIG. 5 in accordance with the fourth embodiment. The vehicle battery temperature control system 300 includes a battery 14 having a heat sink 20 similar to that described above with regard to vehicle battery temperature control system 10. The vehicle battery temperature control system 300 further includes a housing 16 and a heat exchanger 18. The housing 16 includes an insulation member 322 which is similar to insulation member 22 and configured to substantially enclose the housing 16. As illustrated, the battery 14 and heat sink 20, housing 16, insulation member 322, heat exchanger 18 and associated components described herein are included in the battery unit 7 shown in FIG. 1.

The housing 16 defines a chamber 24 that is configured to receive the battery 14 and contain a saturated liquid coolant 26 that substantially immerses the heat sink 20 so that the coolant receives the thermal energy from operation of the battery 14 to cause a phase change of the coolant from a liquid phase to a vapor phase as in the vehicle battery temperature control system 10. In this example, the coolant 26 includes 1,1,1,2-Tetrafluoroethane (known as R-134a) or 2,3,3,3-Tetrafluoroprop-1-ene (known as HFO-1234yf). However, the coolant 26 can include any suitable type of refrigerant. Furthermore, the chamber 24 can be configured such that the saturated liquid coolant 26 in the chamber 24 completely immerses the heat sink 20 as discussed above with regard to vehicle battery temperature control system 10.

The heat exchanger 18 is configured in an elevated position with respect to the chamber 24 to receive vapor phase coolant from the chamber 24, and remove thermal energy from the vapor phase coolant to change the coolant from the vapor phase to the liquid phase. The heat exchanger 18 also can operate to add thermal energy to the vapor phase coolant to maintain the desired temperature and pressure in the chamber 24. In this example, the heat exchanger 18 is positioned substantially above a level of the liquid coolant 26 in the chamber 14.

Furthermore, the system 10 includes a heating system that includes a thermoelectric device 338 that is controlled by the controller 334 in response to a signal provided by the sensor 32. The thermoelectric device 338 is an electrical type of heating device, or any other type of appropriate heating device, similar to thermoelectric device 238 discussed above, and is disposed in the lower portion of the insulation member 322. Specifically, the thermoelectric device 338 is disposed inside of the insulation member 322 that surrounds the housing 16, and is positioned adjacent to the housing 16 or proximate to the housing 16. Like thermoelectric device 238, thermoelectric device 338 is operable to provide a low temperature side and a high temperature side, depending on the polarity of the operating voltage applied to the thermoelectric device 338. Accordingly, in the case of heating the coolant 26, the controller 334 controls the application of a voltage to the thermoelectric device 338 to operate the thermoelectric device 338 so that the high temperature side occurs at the top of the thermoelectric device 338 adjacent to the chamber 16 and the low temperature side occurs at the bottom of the thermoelectric device 338. In this event, the thermoelectric device 338 can operate like a heat pump and draw heat from, for example, an exterior source positioned at the bottom of the insulation member 322. That heat, along with the heat generated by the internal electrical power dissipation in the thermoelectric device 338, results in a hot upper surface of the thermoelectric device 338 that warms the saturated liquid coolant 26. Accordingly, the thermoelectric device 338 can be more efficient at heating the saturated coolant 26 than, for example, the heating device 38 used in the first embodiment.

The heating system further includes an air heat exchanger 348 that is disposed in the lower portion of the insulation member 322. Specifically, the heat exchanger 348 is disposed inside of the insulation member 322 that surrounds the housing 16, and is exposed to outside of the insulation member 322 as shown. The heat exchanger 248 is positioned adjacent to or proximate to the thermoelectric device 338. The air heat exchanger 348 can include, for example, fins that transfer thermal energy from the thermoelectric device 338 to an environment outside the insulation member 322, and receives ambient air and/or forced air (e.g., via a fan) to assist in transferring heat via the thermoelectric device 338 to the coolant 26. Like heating devices 138 and 248, the heat exchanger 348 functions like a heat pump to move heat from the heat source to the saturated liquid coolant 26. Thus, a heating system including heat exchanger 348 can deliver more heat to the saturated liquid coolant 26 than a heating system that includes only an electrical heating element such as thermoelectric device 338. Therefore, less electrical power is consumed for the same amount of heat transfer and corresponding temperature increase within the chamber 24.

The sensor 32 detects when a characteristic of the vapor phase coolant is below a threshold, and provides a signal to the controller 334. That is, the sensor 32 detects when a temperature of the vapor phase coolant is below a threshold (e.g., about 18 degrees Celsius) or when the pressure in the chamber 24 is below a threshold (e.g., about 400 kPa), and provides a signal to the controller 334. In response, the controller 334 activates the thermoelectric device 338 as discussed above with regard to thermoelectric device 238. The thermoelectric device 338 thus acts as a heat pump to facilitate movement of the heat from, for example, the heating device 348 to the saturated liquid coolant 26. The phase change in the coolant 26 resulting from heating the coolant 26 in that low location in the chamber 24 enables the heat to be transport throughout the liquid coolant 26 to achieve the advantages discussed above with regard to the first through third embodiments.

When the sensor 32 detects that the temperature and/or pressure of the coolant in the chamber 24 reaches the prescribed threshold, the sensor 32 signals to the controller 334 to turn off the thermoelectric device 338. Thus, the thermoelectric device 338 heats the coolant 26 to maintain the target pressure and corresponding target temperature of the coolant 26, and thus the target temperature range of the battery 14. Generally, the controller 334 will turn the fan 36 off when operating the thermoelectric device 338. However, the controller 334 can control the fan 36 and thermoelectric device 338 to operate in a cooperative manner to maintain the target pressure and corresponding target temperature of the coolant 26.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), directional terms such as "frontward", "upward" and "above," as well as any other similar directional terms refer to those directions of a vehicle. Accordingly, these terms, as utilized to describe the present invention should be interpreted relative to a vehicle equipped with the vehicle battery temperature control systems described herein.

The terms "detect" or "sense," and their variations, as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle battery temperature control system comprising:
    a battery having a heat sink configured to transfer thermal energy to the battery;
    a heating device including a resistive heater selectively operable to provide thermal energy,
    a housing having a chamber formed therein that is configured to receive the battery, the resistive heater being disposed proximal to the chamber at a location proximal to the battery, the chamber being further configured to contain a saturated liquid coolant that at least partially immerses the heat sink so that the coolant receives the thermal energy from the heating device to cause a phase change of the coolant from a liquid phase to a vapor phase to heat the heat sink to enable the heat sink to heat the battery;
    a heat exchanger configured to receive vapor phase coolant from the chamber and remove thermal energy from the vapor phase coolant to change the coolant from the vapor phase to the liquid phase, and being further configured to return the liquid phase coolant to the chamber; and
    a sensor operable to detect a characteristic of the vapor phase coolant and to signal operation of the heating device to provide the thermal energy based on a relationship between the characteristic of the vapor phase coolant and a threshold.

2. The vehicle battery temperature control system according to claim 1, wherein
    the heating device includes a second heat exchanger.

3. The vehicle battery temperature control system according to claim 2, wherein
    wherein second heat exchanger is configured to receive heated liquid from a heat source.

4. The vehicle battery temperature control system according to claim 3, further comprising
    a valve that is configured to operate when the characteristic of the vapor phase coolant is above the threshold to provide the heated liquid to the second heat exchanger.

5. The vehicle battery temperature control system according to claim 4, further comprising
    a controller configured to control the valve to operate to provide the heated liquid to the second heat exchanger when the characteristic of the coolant is below the threshold.

6. The vehicle battery temperature control system according to claim 2, wherein
    the resistive heater is disposed at a location between the battery and the second heat exchanger.

7. The vehicle battery temperature control system according to claim 1, further comprising
    a fan that is configured to operate when the sensor detects that the characteristic of the vapor phase coolant is above the threshold to increase the removal of thermal energy from the vapor phase coolant by the heat exchanger.

8. The vehicle battery temperature control system according to claim 1, wherein
the sensor includes a temperature sensor operable to sense a temperature of the coolant as the characteristic.

9. The vehicle battery temperature control system according to claim 1, wherein
the sensor includes a pressure sensor operable to sense a pressure in the chamber as the characteristic.

10. The vehicle battery temperature control system according to claim 1, wherein
the heat exchanger includes a condenser that is positioned above a level of the liquid coolant in the chamber, with the condenser being fluidly coupled to receive the vapor phase coolant, the condenser being operable to remove heat from the vapor phase coolant to create the liquid phase coolant, and being fluidly coupled to return the liquid phase coolant to the chamber.

11. The vehicle battery temperature control system according to claim 1, further comprising
an insulation member configured to enclose the housing.

12. The vehicle battery temperature control system according to claim 1, wherein
the chamber is configured such that the saturated liquid coolant in the chamber completely immerses the heat sink.

13. The vehicle battery temperature control system according to claim 1,
wherein the saturated liquid coolant includes one of 1,1,1 2-tetrafluoroethane and 2,3,3,3-tetrafluoroprop-1-ene.

14. The vehicle battery temperature control system according to claim 1, wherein
the resistive heater is adjacent to the chamber.

15. The vehicle battery temperature control system according to claim 1, wherein
the resistive heater is disposed below the battery and the chamber.

16. A vehicle battery temperature control method comprising:
operating a heat exchanger to receive vapor phase coolant from a chamber that is formed in a housing and configured to contain a battery having a heat sink and a saturated liquid coolant that at least partially immerses the heat sink, the operating of the heat exchanger removes thermal energy from the vapor phase coolant to change the coolant from the vapor phase to liquid phase and returns liquid phase coolant to the chamber;
detecting a characteristic of the vapor phase coolant; and
operating a heating device including a resistive heater disposed proximal to the chamber at a location proximal to the battery so that the resistive heater provides thermal energy based on a relationship between the characteristic of the vapor phase coolant and a threshold, so that the coolant receives the thermal energy from the heating device to cause a phase change of the coolant from the liquid phase to the vapor phase to heat the heat sink which transfers thermal energy to the battery.

17. The vehicle battery temperature control method according to claim 16, wherein
the operating of the heating device includes operating a second heat exchanger to receive heated liquid from a heat source.

18. The vehicle battery temperature control method according to claim 17, wherein
the operating of the heating device includes operating the resistive heater that is disposed at a location between the battery and the second heat exchanger to provide the thermal energy.

19. The vehicle battery temperature control method according to claim 16, further comprising
operating a fan when the characteristic of the vapor phase coolant is above the threshold to increase the removal of thermal energy from the vapor phase coolant during the operation of the heat exchanger.

20. The vehicle battery temperature control method according to claim 16, wherein
the detecting includes detecting a temperature of the coolant as the characteristic.

21. The vehicle battery temperature control method according to claim 16, wherein
the detecting includes detecting a pressure in the chamber as the characteristic.

22. The vehicle battery temperature control method according to claim 16, wherein
the operating of the heating device includes operating the resistive heater that is disposed adjacent to the chamber to provide the thermal energy.

23. The vehicle battery temperature control method according to claim 16, wherein
the operating of the heating device includes operating the resistive heater that is disposed below the battery and the chamber to provide the thermal energy.

* * * * *